US012589569B2

(12) United States Patent
Rinne et al.

(10) Patent No.: US 12,589,569 B2
(45) Date of Patent: Mar. 31, 2026

(54) BOX ERECTING DEVICE

(71) Applicant: Flex-Line Automation, Inc., Chester, IL (US)

(72) Inventors: Rhett L. Rinne, Chester, IL (US); Eric M. Van De Mark, Chester, IL (US); Gabe M. Meyer, Sainte Genevieve, MO (US)

( * ) Notice: Subject to any disclaimer, the term of this patent is extended or adjusted under 35 U.S.C. 154(b) by 0 days.

(21) Appl. No.: 18/669,034

(22) Filed: May 20, 2024

(65) Prior Publication Data

US 2024/0383219 A1 Nov. 21, 2024

Related U.S. Application Data

(60) Provisional application No. 63/503,326, filed on May 19, 2023.

(51) Int. Cl.
*B31B 50/00* (2017.01)
*B31B 50/26* (2017.01)
*B31B 50/78* (2017.01)
*B31B 120/30* (2017.01)

(52) U.S. Cl.
CPC ............ *B31B 50/78* (2017.08); *B31B 50/262* (2017.08); *B31B 2120/302* (2017.08)

(58) Field of Classification Search
CPC .. B31B 50/78; B31B 50/262; B31B 2120/302
USPC ....... 493/309, 183, 181, 319, 177, 162, 310, 493/167, 311, 128; 53/566, 564, 381.1, 53/377.2, 377.5, 458, 563; 198/698, 726, 198/732, 377.01, 403, 416, 443
See application file for complete search history.

(56) References Cited

U.S. PATENT DOCUMENTS 8,961,380 B2 * 2/2015 Langen .................. B31B 50/28 493/183
2013/0090222 A1 * 4/2013 Green ..................... B31B 50/00 493/162
2015/0072847 A1 * 3/2015 Graham .................. B31B 50/28 493/128
2019/0061299 A1 * 2/2019 Chu ...................... B31B 50/006
2022/0227514 A1 * 7/2022 Risnes .................. B65B 43/265

* cited by examiner

*Primary Examiner* — Jacob A Smith
(74) *Attorney, Agent, or Firm* — Charles McCloskey

(57) ABSTRACT

A box erecting device and method has two rails and two platforms upon moveable clips that provide for a wide range of product sizes and configurations. The rails begin near each other then widen apart along their length. The two rails extend from a fore upright downward and outward to a cross member. The two platforms include a middle member and an aft upright. A spine connects to the fore upright, the middle member, the cross member, and the aft upright. A fore leg and a mutually parallel aft leg descend from the spine to their baseplates. The baseplates attach to a supporting surface. The rails extend below the elevation of the spine and below the aft member. The components of the invention connect with mechanical clips inserted into slots upon the components. Installation, adjustment, and maintenance of the device utilizes hand tools.

9 Claims, 7 Drawing Sheets

BOX ERECTING DEVICE

CROSS-REFERENCE TO RELATED APPLICATIONS

This non-provisional application claims priority to provisional application Ser. No. 63/503,326 filed on May 19, 2023 which have common inventors.

BACKGROUND OF THE INVENTION

The present invention relates to machinery for product flow paths in general and more particularly to a frame supporting two rails that opens and then folds a product for sealing and later closure.

In ancient days, people made chests and lockers from wood of all description. For rare, select applications, people carved chests from stone with appropriate lids. Wooden chests and lockers took foresters to find the wood, millers to prepare the wood, and carpenters to assemble and join the wood into chests and lockers with matching lids. Chests often had thick construction to deter thieves and insect damage. Chests often had reinforcement from steel banding. In the middle ages, typically for noblemen and clergy, select chests also had intricate metal locking mechanisms. Such mechanisms deployed multiple bolts and rods that secured a lid to the body of a chest, often from a single lock. Wooden chests acquired more quality over the centuries and decades but still utilized much labor in their construction. Wooden chests had an ill fit to storing inexpensive or perishable goods.

With the development of wood pulp and machinery to make it, wood pulp led to boxes made from corrugated material, often cardboard. Corrugated cardboard had a lightweight rigid construction suitable to making boxes and cartons of a wide variety of dimensions. Corrugated cardboard utilized mechanical production in sheets and rolls of great length. That lowered its labor cost during manufacturing. Boxes of corrugated cardboard thus became readily available for goods of all description from single to large quantities. The lighter density of cardboard compared to wood allows manufacturers, warehouses, and transportation to move product at lesser cost to consumers.

DESCRIPTION OF THE PRIOR ART

Boxes take many forms from small boxes for paper clips to large boxes for cubic yards of produce. Grosses of decorated smaller boxes often fit into larger plain boxes for warehousing and transportation. A box often begins as a piece unrolled from a spool of corrugated cardboard, or alternatively a sheet of corrugated cardboard of fixed initial dimensions. The piece or sheet then undergoes cutting, scoring, intermittent scoring, and initial gluing to form a flat for a product. A product then can become a box of any desired dimension. The product typically has one sealed seam and a variety of opposing major flaps and minor flaps incised about the walls of the product. Like the chests and lockers of old, people want to put goods into a box. A flat product does not yet fulfill that goal.

Certainly, a skilled person may unfold and open flat product to its box form. A person though may only do so many boxes per hour before eventually tiring. To increase production rates and duration, manufacturers developed robots. The robots operate upon electrical power under computer control and generally from a fixed point. The prior art utilizes controllably actuated robotic arms that grasp a flat product from a supply stack using onboard grippers, extending the grippers to open the product into a rectangular hollow tubular state, place the flat product upon a jig, and then move the product along the jig transitioning it from flat to unfolded.

Though preceding description has referred to product, the description also applies to boxes, cartons, packages, cases, and the like.

The box erecting device and method overcomes the above-mentioned disadvantages and drawbacks of the prior art. As such, the general purpose of the present invention, which will be described subsequently in greater detail, is to provide a new and improved box erecting device and method which has all the advantages of box erecting device and method which are not anticipated, rendered obvious, suggested, or even implied by the prior art, either alone or in any combination thereof.

SUMMARY OF THE INVENTION

The box erecting device and method has two rails and two platforms upon moveable clips that provide for a wide range of product sizes and configurations.

The two rails extend from a fore upright downward and outward to a cross member. The two platforms include a middle member and an aft upright. A spine connects to the fore upright, the middle member, the cross member, and the aft upright. A fore leg and a mutually parallel aft leg descend from the spine to their baseplates. The baseplates attach to a supporting surface. The rails extend below the elevation of the spine and below the aft member. The components of the invention connect with mechanical clips inserted into slots upon the components. Installation, adjustment, and maintenance of the device utilizes hand tools.

There has thus been outlined, rather broadly, the more important features of the invention in order that the detailed description thereof that follows may be better understood and in order that the present contribution to the art may be better appreciated.

This invention cooperates with a controllable articulated robotic arm. The robotic arm includes grippers mounted on its back plate and a swinging arm to open folded flat boxes, cases, and cartons, or product. Typically, the robotic arm, or machine, grips and opens a product and the arm moves the product in a first direction. This closes a first bottom minor flap of a product on one platform and then the arm moves the box in a second direction to close a second bottom minor flap. The arm then pushes the product between the two side rails then folds both major flaps upward to a closed state. A separate sealing head then seals the product bottom.

More particularly, the invention guides a product within the grip of the controllable articulated robotic arm that places the open product over a curved platform and presses the product down to fold a bottom minor flap of the product. The robotic arm then rotates the product and folds the second minor flap to a coplanar orientation with the other minor flap. The invention guides the product under robotic arm propulsion laterally in a horizontal direction, that is, parallel to the spine, to close both major flaps. With the product having four flaps closed properly, the invention again guides the product under robotic arm propulsion forward across a taping head that seals the product closed upon one end. Upon exiting from the invention, the product has attained a fully erected state and may then receive goods loaded into it. Additional features of the invention will be described hereinafter, and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and devices for carrying out the several purposes of the present invention. It is important, therefore, that the claims be regarded as including such equivalent constructions insofar as they do not depart from the spirit and the scope of the present invention.

It is therefore an object of the present invention to provide a new and improved box erecting device and method that easily adapts to a wide variety of product, boxes, and cartons.

Still another object of the present invention is to provide a box erecting device and method that adjusts its product travel path utilizing manual tools.

Still another object of the present invention is to provide a box erecting device and method that has product move upon it smoothly without tearing or heat of friction.

Still another object of the present invention is to provide a box erecting device and method that may be easily and efficiently manufactured and marketed to the shops, fabricators, factories, and supply sources.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
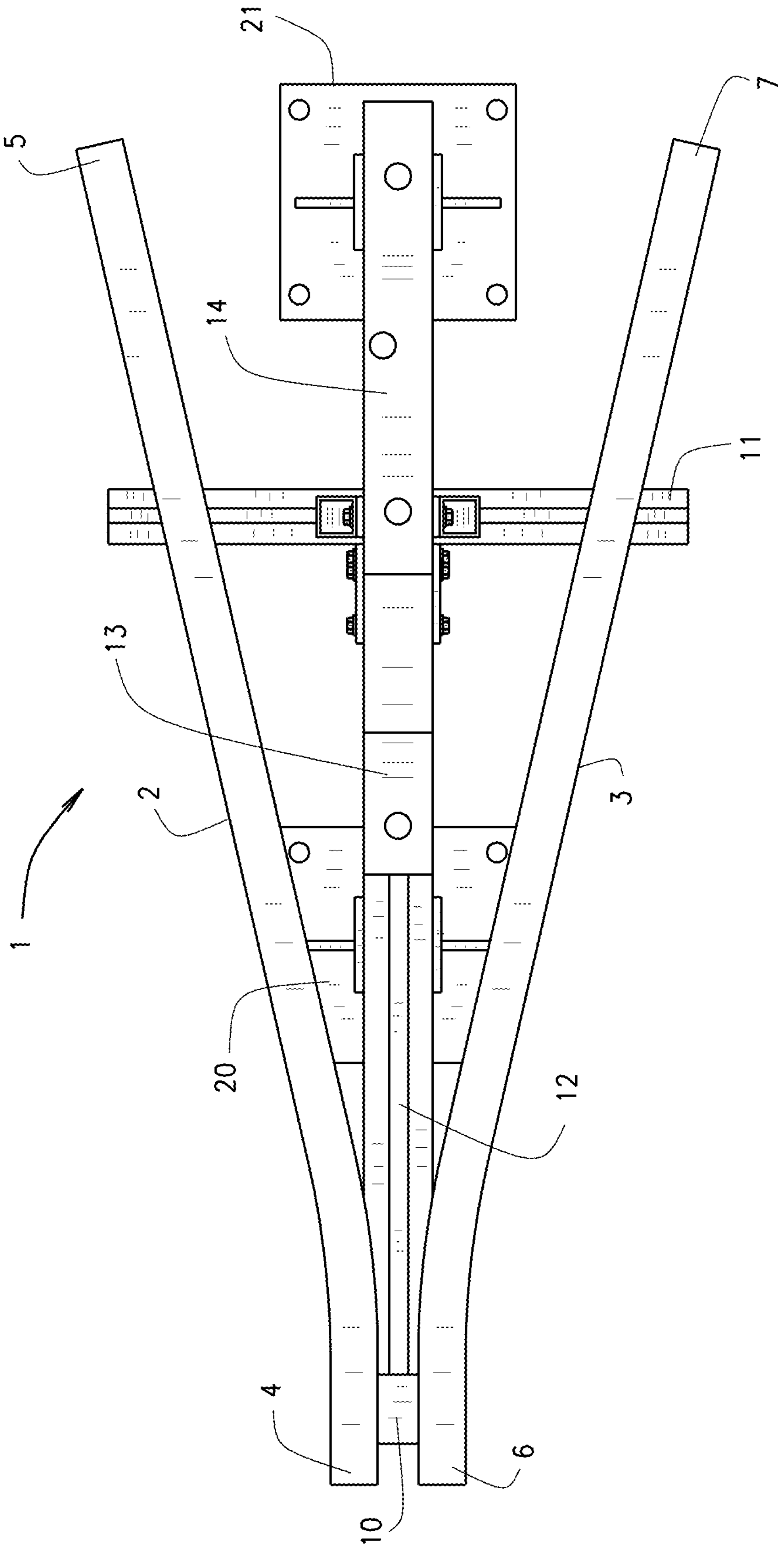
FIG. 1 is a top view of the preferred embodiment of the present invention.

Referring now to the drawings, and particularly to FIGS. 1-7, a preferred embodiment of the box erecting device and method of the present invention is shown by the reference numeral 1. Ah the humble box. From breakfast cereals, shoes, and mailing packages to auto parts, lawnmowers, and appliances, boxes carry a wide variety of goods within them. A box has a generally rectangular prismatic form with two opposite ends upon four walls in two parallel pairs. Each end has two minor flaps, generally beneath the thinner walls, and two major flaps, generally beneath the wider walls. A flap has less length then its corresponding wall has height and the same width as its corresponding wall. During assembly, a flat box is opened, the minor flaps are folded on one end, then the major flaps are folded upon the minor flaps, and the abutting major flaps are then secured to the minor flaps or otherwise.

More particularly, a robotic carton erector machine manipulates a flat product on its way to becoming a box. The machine plucks, or picks a flat product from a supply stack with its grippers at the end of arm tooling of the robotic machine. Picking refers to the machine attaining control over the product in translation and in rotation without penetrating the product. Picking uses for example suction, air flow at lower pressure than ambient, magnetism, wide mechanical clamps, and the like. The machine then extends its grippers to open the product to a substantially rectangular, hollow, tubelike state. The machine next moves the product to press a bottom minor flap of the product upon a part of the invention. The machine continues its motion that moves the product to press the second bottom minor flap against a second part of the invention. Then the machine moves the product with its bottom minor flaps folded along a horizontal path of travel. Horizontal refers to parallel to the supporting surface beneath the machine and in the direction of the length of a spine of the machine as later described. The machine also holds the bottom flaps in their folded position and moves the product in a lateral direction nearly perpendicular to the horizontal path of travel to fold both bottom major flaps upward against the folded bottom flaps. And then the machine moves the product forward upon the invention in a horizontal path to seal the bottom major flaps in a closed state. Having described boxes and their path from flat to open for a load, the description turns to the invention that manipulates the box and its flaps along that path.

FIG. 1 shows the invention 1 in a top view. The invention has a frame formed from a fore upright 10, here shown on end, and mechanically connected a spine 12. The spine is shown below the fore upright and extending perpendicular to the upright in the plane of this figure. The spine has its length greater than a length of the fore upright. Away from the fore upright, the spine has a middle member 13 extending upwardly from the spine and having the portion shown here parallel to the spine spaced beneath it. The middle member attains an elevation above the fore upright. The spine continues away from the middle member to an aft member 14. The aft member having a portion shown here coplanar with the portion of the middle member shown before it, that is, below in the plane of the figure, towards the fore upright 10. The aft member mechanically connects to an aft upright, not shown. The frame of the invention connects to an aft baseplate as at 21 below the aft upright and the spine 12. Opposite the aft baseplate, the invention has a fore baseplate as at 20 below the spine and between the fore upright 10 and the middle member 13. The two baseplates 20, 21 are located into the plane of this figure.

Then below the spine, the frame of the invention 1 has a cross member 11 that mechanically connects to the spine. The cross member has its length greater than a width of the spine by at least a factor of four. The cross member extends outwardly from the spine and has a generally perpendicular orientation to the spine. The fore upright 10, spine 12, middle member 13, aft member 14, and cross member 11 form a generally T like shape as shown.

Appearing outwardly from the frame, the invention 1 has a left rail 2, here shown to the left of the figure, and a counterpart right rail 3 to the right of the figure. The left rail and the right rail have a mutual spacing outwardly from the spine 12 as shown. The left rail 2 has a fore end as at 4 shown near the fore upright 10 and an opposite aft end as at 5 generally shown outwardly of the aft member 14. The right rail 3 has its fore end as at 6 shown near the fore upright 10 and its opposite aft end as at 7 generally shown outwardly of the aft member 14. As later shown, the fore ends 4, 6 of the rails 2, 3 have a mechanical connection to the fore upright 10 while the rails 2, 3 have a mechanical connection but to the cross member 11 spaced inward from the aft member 14 and the aft ends 5, 7 have a spacing outward from the aft member. The mechanical connections of the rails to the fore upright and the cross member allow for a user to adjust the elevation of each rail upon the fore upright, and the spacing of each rail from the spine upon the cross member. These adjustments allow the invention to receive and erect boxes of various sizes.

Figure 2:
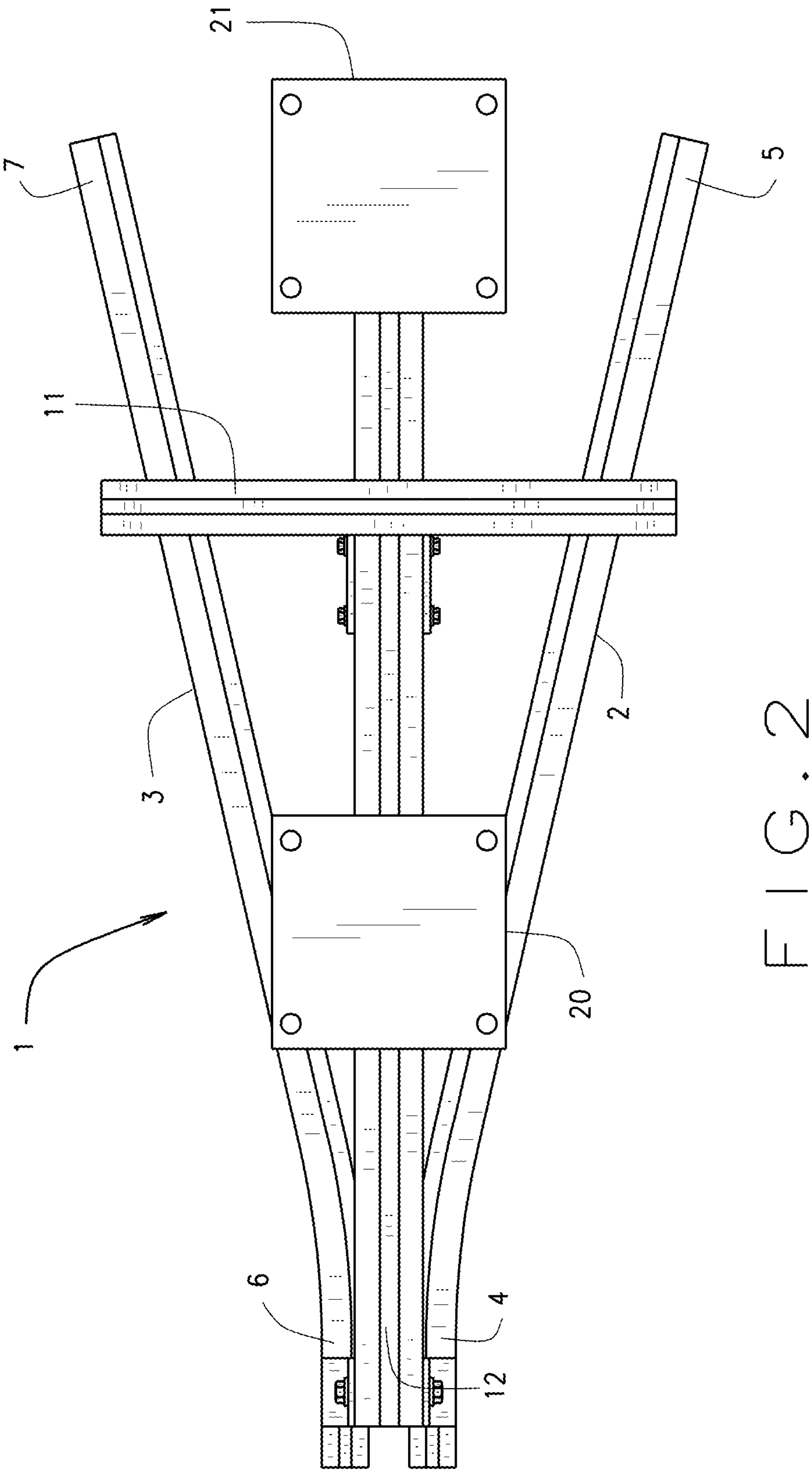
FIG. 2 shows a bottom view of the present invention.

Inverting the invention from the view in FIG. 1, FIG. 2 shows the invention 1 from the bottom, that is, with the baseplates 20, 21 in the foreground and the rails 2, 3 in the background of the figure. The baseplates have a generally square shape with at least two holes, preferably four holes, for anchor bolts, not shown. The spine 20 spans from the fore baseplate 20 to the aft baseplate 21. Above the aft baseplate, the invention has its cross member 11 extending left and right from the spine in this view, again forming a generally T shape. Into the plane of the figure, the rails 2, 3 extend from the fore upright, not shown, behind the fore baseplate 20 and over the cross member 11, that is, into the plane of the figure partially concealed behind the cross member. Here, as in FIG. 1, the rails flare outwardly from the spine upon the cross member. Unlike in FIG. 1, the rails have another portion of their cross section shown, here an edge. The rails have an angled shape, that is, L shaped cross section of two legs extending from a common center. Here, one leg is shown on edge while the other leg extends outward and flat from the first leg. The rails 2, 3 have their respective fore ends 4, 6 shown near each other and towards the bottom of the figure. The respective aft ends 5, 7 of the rails 2, 3 have their spaced apart positions above the cross member 11 towards the top of the figure.

Figure 3:
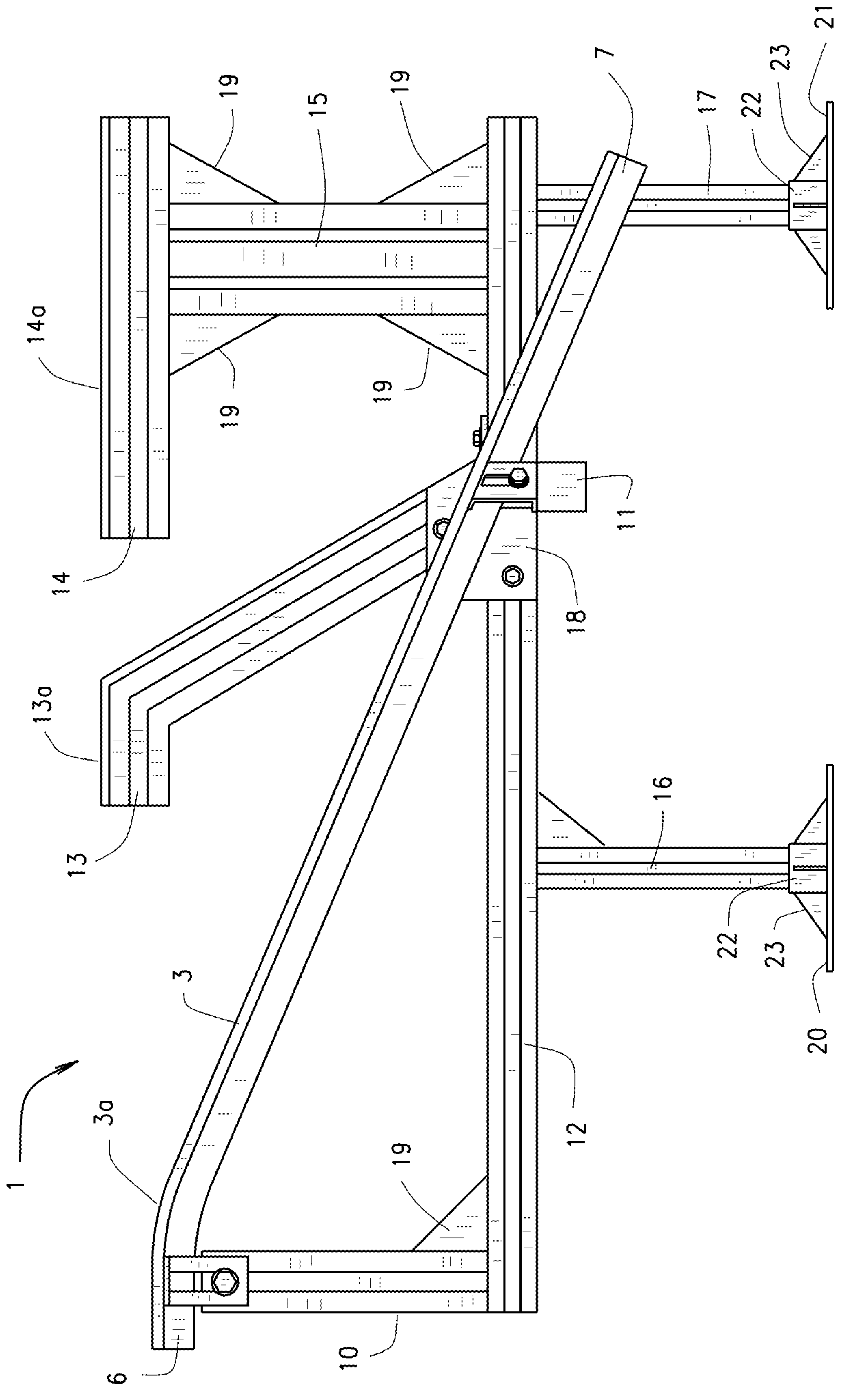
FIG. 3 is a side view of the present invention.

FIG. 3 then has the invention 1 shown from the side, its right side. The invention has its frame with the second rail 3 extending from the fore upright 10 along the spine 12, along the cross member 11 and outward and below the aft member 14. In this view the frame of the invention has additional components. The fore upright 10 joins perpendicular to the spine 12 and has a gusset 19 in the included angle between the fore upright and the spine. The gusset has a generally triangular shape and mechanical connections, not shown, to both the fore upright and the spine. Away from the fore upright, the frame has the middle member 13. The middle member has its elevation similar to that of the top of the fore upright. The middle member extends parallel to the spine below for a portion of the middle member's length. The middle member then bends downwardly towards the spine for the remainder of its length. The middle member keeps the same cross section through its length. The middle member then has a mechanical connection to the spine 12 using a plate 18 that covers a last portion of the middle member and the depth of the spine as shown. As before, the aft member 14 has a spacing away from the middle member while the aft member and the middle member maintain the same elevation. The aft member has a perpendicular connection to an aft upright 15, preferably by bolts. The aft member and the aft upright 15 also have another gusset 19 in the included angle between them. The aft upright 15 descends from the aft member and has its own perpendicular connection to the spine 12. The aft upright has that connection inward from the end of the spine as shown. And the aft upright and the spine also have another gusset 19 in the included angled between them and towards the fore upright as shown.

Having shown and described the baseplates 20, 21 and spine 12 above, the spine connects to the baseplates as shown in this figure. The spine has a fore leg 16 that descends from it in the opposite direction as the fore upright 10. The fore leg has a spacing away from the fore upright, at least twice the thickness of the fore upright, as shown. The fore leg is generally located ahead of the center of the spine, that is, towards the fore upright. The fore leg 16 and the spine 12 have another gusset 19 between them in the included angle away from the fore upright. The fore leg 16 has its length greater than that of the fore upright. The fore leg's length has a magnitude compatible with a human operator or a robotic machine, and that fits along the flow path of box erection before the box reaches the invention and after the box departs the invention. Opposite the spine, the fore leg 16 fits into a socket 22 centered upon the baseplate 20. The socket has four second gussets 23, also triangular, that span outwardly from the socket toward the edges of the baseplate. The second gussets have an equiangular spacing about the socket. Preferably, the socket is of square cross section and a width suitable for receiving the foreleg in a tight connection.

Away from the cross member 11, here shown on end, and from the aft upright 15, the spine has its aft leg 17 mutually parallel and spaced apart from the fore leg 16. The aft leg 17 descends from the spine 12 in the opposite direction as the aft upright 15. The aft leg has a spacing away from the aft upright, at least the thickness of the aft upright, as shown. The aft leg is generally located after the center of the spine, that is, towards the aft upright. In this view, the aft leg 17 and the spine 12 have a perpendicular connection without a gusset 19. In an alternate embodiment, the aft leg 17 and the spine 12 have another gusset 19 between them in the included angle towards the fore upright. The aft leg 17 has its length greater than that of the fore upright. The aft leg's length also has its magnitude compatible with a human operator or a robotic machine, and that fits along the flow path of box erection before the box reaches the invention and after the box departs the invention. The aft leg 17 has the same length as the fore leg 16. Opposite the spine, the aft leg 17 fits into a socket 22 centered upon the baseplate 21. This socket 22 also has four second gussets 23 of triangular shape that span outwardly from the socket toward the edges of the baseplate. The second gussets have an equiangular spacing about the socket as before and a square cross section and a width suitable for receiving the aft leg in a tight connection.

With the frame described, the right, or second rail 3 extends from the left to the right of this figure from the fore upright 10 then down along the spine 12, out along the cross member 11, and outward and below the aft member 14. The right rail has an angle shaped cross section, later shown in FIGS. 5, 6, 7, with a first leg of the angle extending out of the plane of this figure toward the viewer and the second leg of the angle oriented downwardly aligned towards the fore leg 16 and the aft leg 17. The first leg of the angle and the second leg of the angle have a perpendicular orientation from a common vertex. Here, the vertex has its position towards the spine 12. Upon the first leg, the right rail has a layer 3*a* attached to it. The layer 3*a* provides a low friction surface for product, boxes, and cartons to slide upon. The layer 3*a* extends from the fore end 6 to the aft end 7 of the right rail 3. Low coefficient of friction includes from 0.05 to 0.51.

Figure 4:
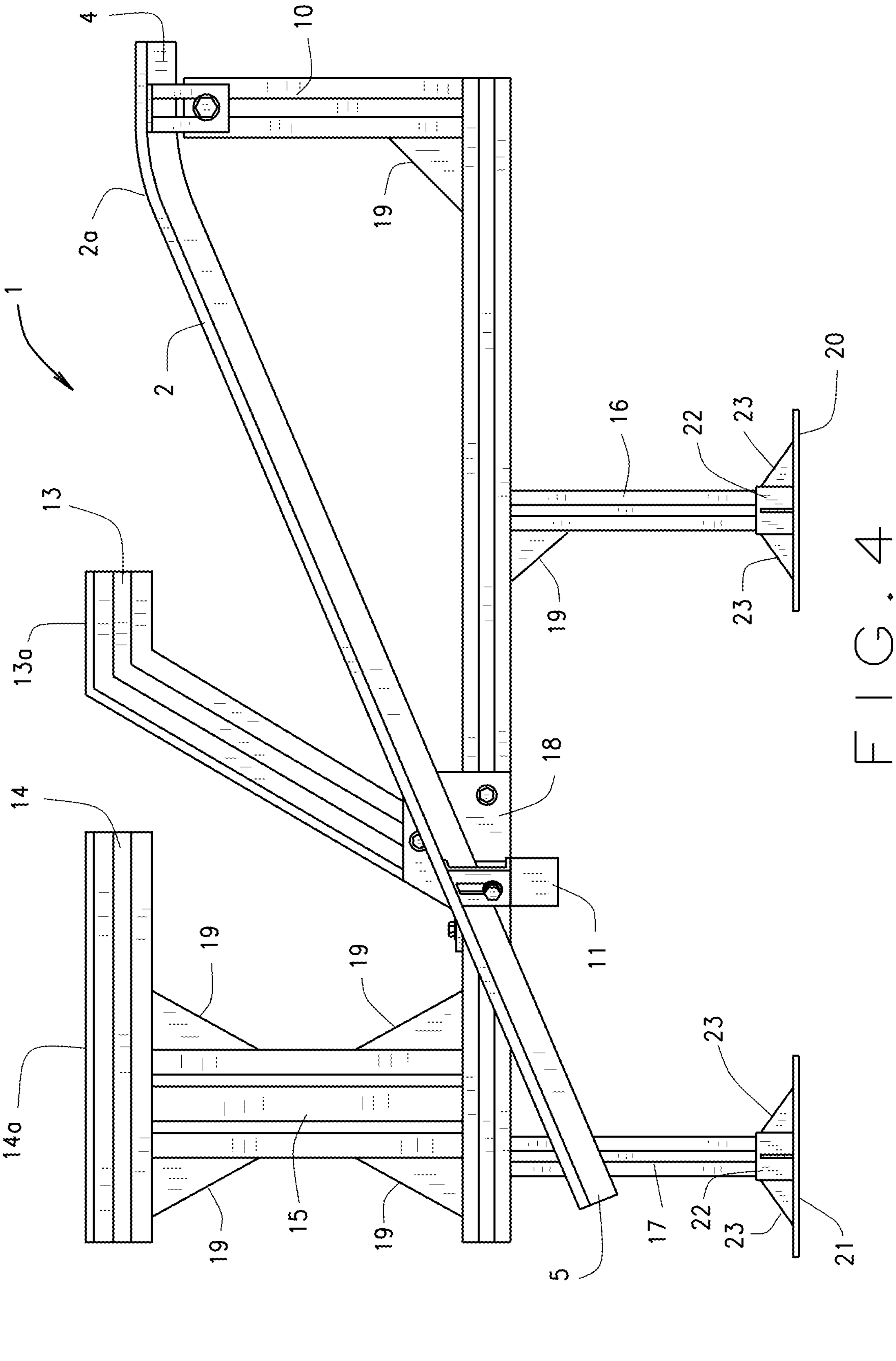
FIG. 4 illustrates another side view of the present invention, opposite that of FIG. 3.

Turning the invention once more, FIG. 4 shows a side view of the invention 1 with its left side in the foreground and the right side in the background. The invention has its frame with a left or first rail 2 that extends from outward and below the aft member 14, past the cross member 11, along the spine 12, and to the fore upright 10. From the left of this figure, as before, the aft member 14 has a spacing away from the middle member while the aft member and the middle member maintain the same elevation. The aft member has its perpendicular connection to the aft upright 15, preferably by bolts. The aft member and the aft upright 15 also have their gusset 19 in the included angle between them. The aft upright 15 descends from the aft member to its own perpendicular connection to the spine 12. The aft upright has that connection inward from the end of the spine as shown towards the left of the figure. The aft upright and the spine also have another gusset 19 in the included angled between them and towards the fore upright as shown. Away from the aft upright, the frame has the middle member 13 with its elevation similar to that of the top of the fore upright. The middle member extends parallel to the spine below for a portion of the middle member's length. The middle member then bends downwardly towards the spine and towards the aft upright for the remainder of its length. The middle member keeps the same cross section through its length. The middle member then connects mechanically to the spine 12 at the plate 18 that covers a last portion of the middle member and the depth of the spine as shown. Away from the plate 18 and the aft upright 15, the frame of the invention has the fore upright 10 joined perpendicular to the spine 12 with a gusset 19 in the included angle between the fore upright and the spine. The triangular gusset also mechanically connects to both the fore upright and the spine, connection not shown.

As previously described, the spine 12 connects to the baseplates 20, 21 as shown in this figure. Away from the aft end 5 and the cross member 11, the spine has its aft leg 17 spaced away and before the aft upright 15. The aft leg 17 descends from the spine 12 in the opposite direction as the aft upright 15. The aft leg has a spacing away from the aft upright, at least the thickness of the aft upright, as shown. The aft leg has a general position before the center of the spine, that is, towards the aft upright. Here, the aft leg 17 and the spine 12 have a perpendicular connection that lacks a gusset. In an alternate embodiment, the aft leg 17 and the spine 12 include another gusset 19 between them towards the fore upright. The aft leg 17 has its length greater than the length of the fore upright above it. The aft leg's length also has its magnitude compatible with a human operator or a robotic machine, and that fits along the flow path of box erection before the box reaches the invention and after the box departs the invention. The aft leg 17 also has the same length as the fore leg 16 as shown so that the spine attains a level orientation to a horizontal plane defined by a surface beneath the baseplates 20, 21. Opposite the spine, the aft leg 17 fits into a socket 22 centered upon the baseplate 21 that has as before the four triangular second gussets 23 outwardly from the socket toward the edges of the baseplate. The second gussets have their equiangular spacing about the socket as before and a square cross section and a width suitable for receiving the aft leg in a tight connection.

The spine has a fore leg 16 that descends from it in the opposite direction as the fore upright 10. The previously described aft leg 17 has its mutually parallel orientation and spacing apart from the fore leg 16. The fore leg has its spacing away from the fore upright, at least twice the thickness of the fore upright, as shown. The fore leg has its general position ahead of the center of the spine, that is, away from the plate 18 and towards the fore upright. The fore leg 16 and the spine 12 have the included gusset 19 between them. The fore leg 16 has its length greater than that of the fore upright. As before, the fore leg's length has a magnitude compatible with a human operator or a robotic machine, and that fits along the flow path of box erection before the box reaches the invention and after the box departs the invention. Then opposite the spine, the fore leg 16 fits into the socket 22 centered upon the baseplate 20. That socket has the four triangular second gussets 23, spanning outwardly from the socket toward the edges of the baseplate. The second gussets have their equiangular spacing about the socket. Preferably, the socket is of square cross section and a width suitable for receiving the foreleg in a tight connection.

After describing this view of the frame, the left or first rail 2 extends from the left to the right of this figure from outward and below the aft member 14, past the cross member 11, upward along the spine 12, and to the fore upright 10. The first rail also has an angle shaped cross section, later shown in FIGS. 5, 6, 7. The angled shape has a first leg of it angle extending out of the plane of this figure toward the viewer and the second leg of it oriented downwardly aligned towards the fore leg 16 and the aft leg 17. The first leg of the angle and the second leg of the angle have a perpendicular orientation from a common vertex. Here, the vertex has its position towards the spine 12. Upon the first leg, the left rail has a layer 2*a* attached to it akin to the layer 3*a*. The layer 2*a* also provides a low friction surface for product, boxes, and cartons to slide upon. The layer 2*a* extends from the aft end 5 to the fore end 4 of the left or first rail 2. As before, low coefficient of friction includes from 0.05 to 0.51.

Figure 5:
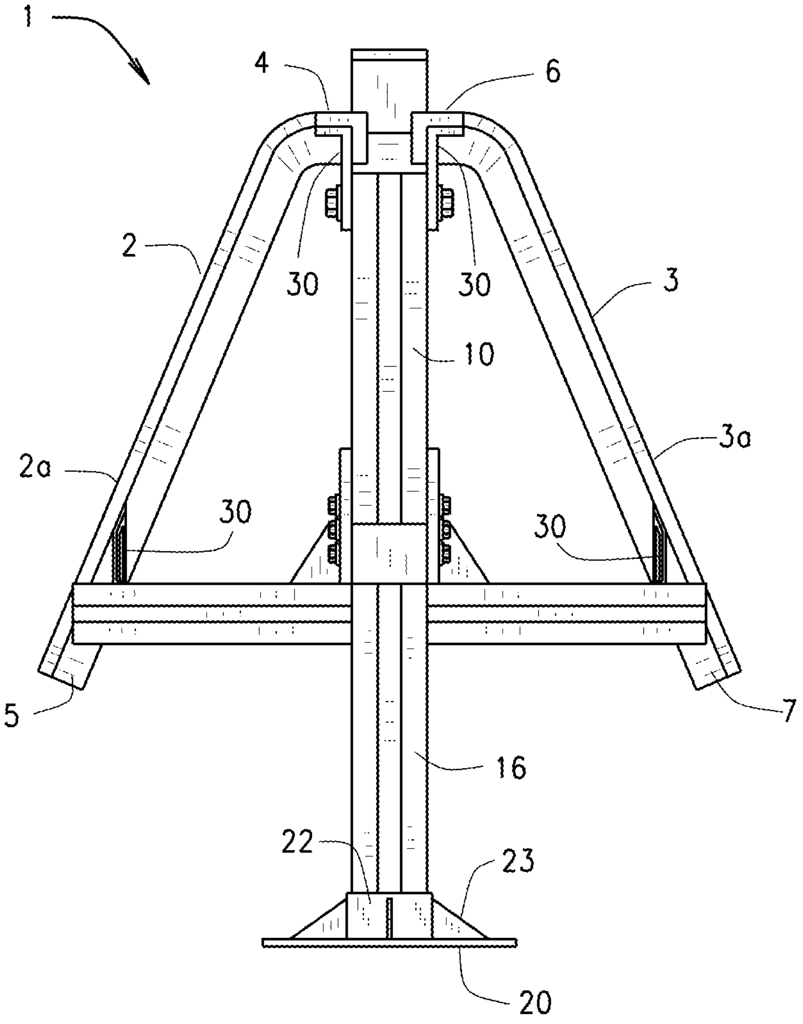
FIG. 5 is a front view of the present invention.

FIG. 5 provides a front view of the invention 1 with the fore upright 10 and fore leg 16 in the foreground with the fore ends of the rails in the center of the foreground. This view shows the first rail 2 and the second rail 3 widening and descending from the top of the fore upright down past the cross member to their aft ends below the spine 12. Each of the fore ends, 4, 6 of the rails 2, 3 connects to the fore upright 10 using a mechanical connection, such as a clip 30 that bolts to the fore upright and the upright leg of each rail. The first rail 2 then extends downwardly and outwardly, that is, to the left in this figure to the cross member 11. The first rail also connects to the cross member mechanically, such as with another clip 30 to the upright leg of the rail, that is, the leg without the layer 2*a*. Outwardly and downward from the cross member, the first rail has its aft end 5 shown into the plane of the figure.

In a near mirror image from the first rail 2 and the left portion of the invention shown, this view also shows the second rail 3 having its fore end 6 have a clip 30 type connection to the fore upright. Then the second rail 3 extends downwardly and outwardly, that is, to the right in this figure to the cross member 11 and shown opposite that of the first rail 2 described above. The second rail also connects to the cross member mechanically, such as with another clip 30 to the upright leg of the rail, that is, the leg without the layer 3*a*. Outwardly and downward from the cross member, the second rail has its aft end 7 shown into the plane of the figure. Though the two rails appear as mirror images in this figure, the rails may attain different curvilinear paths suitable for erecting certain boxes, cartons, and products during usage. As before, the fore upright 10 connects to the spine 12, the cross member 11 connects to the spine rearward of the fore upright, and the fore leg 16 depends from the spine 2 into the plane of this figure behind the fore upright. The fore leg 16 then fits into the socket 22 supported by its gussets 23 upon the baseplate 20.

Figure 6:
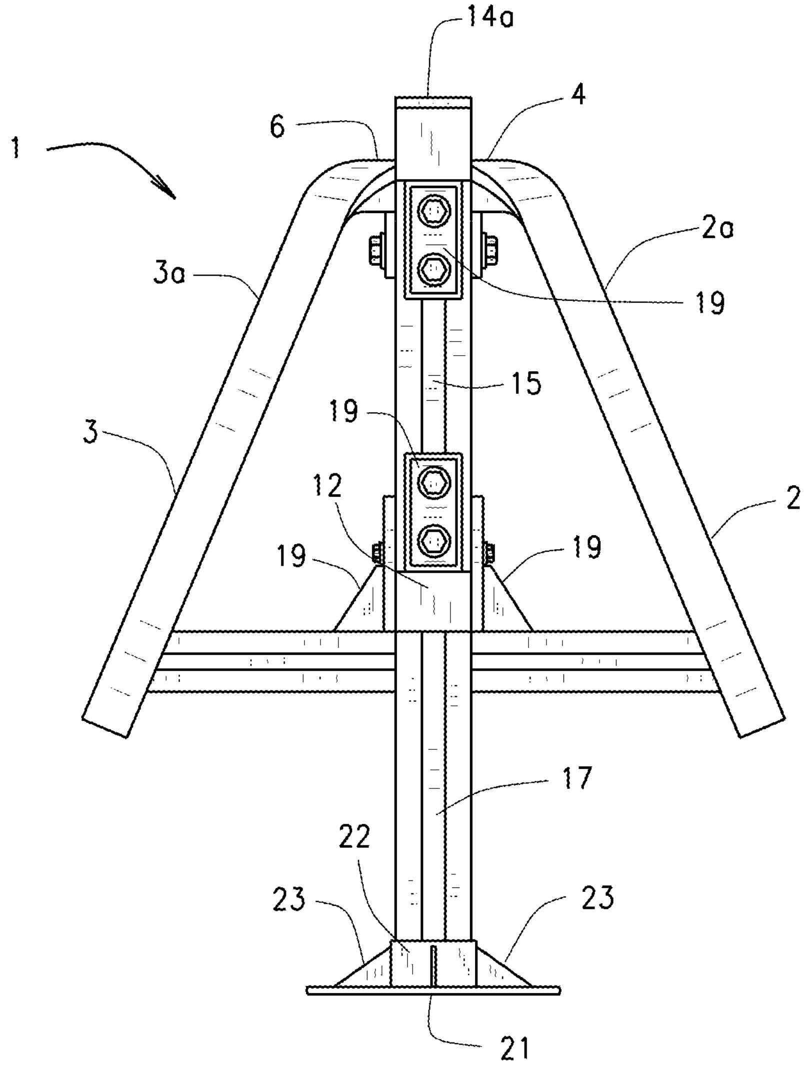
FIG. 6 provides a back view of the present invention.

FIG. 6 then shows the invention 1 shown in a back view opposite that of FIG. 5. In this figure, the invention 1 has its aft upright 15 and aft leg 17 in the background into the plane of this figure and the aft ends of the rails spaced apart from the center of the foreground. This view shows the first rail 2 and the second rail 3 narrowing and rising from the two aft ends past the cross member 11 to their fore ends behind the aft upright. The rails 2, 3 have their respective fore ends 4, 6 approach the same plane as a layer 14*a* upon the aft member 14 so that the layers 2*a*, 3*a*, of the rails move products, boxes, and cartons into the plane of this figure. Similar to the above description, each of the rails 2, 3 along its length connects to the cross member 11 using a mechanical connection, such as a clip 30 that bolts to the cross member and the upright leg of each rail as shown. The second rail 3 then extends upwardly and inwardly, that is, to the right in this figure to the aft member, not shown, behind the aft upright 15. The second rail also connects to the fore upright mechanically into the plane of the figure, as previously described. Outwardly and downward from the cross member, the second rail has its aft end 7 shown out of the plane of the figure.

In a near mirror image from the second rail 3 and the left portion of the invention shown, this view also shows the first rail 2 having along its length a clip 30 type connection to the cross member. Then the first rail 2 extends upwardly and inwardly, that is, to the left in this figure to the aft member, not shown, behind the fore upright 15 and shown opposite that of the second rail 3 previously described. The first rail also has its mechanical connection, such as a clip 30, to the cross member, upon the upright leg of the first rail, that is, the leg without the layer 2*a*. Inwardly and upward from the cross member, the first ail has its fore end 4 shown into the plane of the figure approaching the aft member. Though the two rails portray mirror images in this figure, the rails may make different curvilinear paths during usage for erecting certain boxes, cartons, and products. As before, the aft upright 16 connects to the spine 12, the cross member 11 connects to the spine forward of the aft upright, and the aft leg 17 depends from the spine 2 into the plane of this figure slightly behind the aft upright. The aft leg 17 connects to the baseplate 21 as it fits into the socket 22 supported by its gussets 23 thereon.

Figure 7:
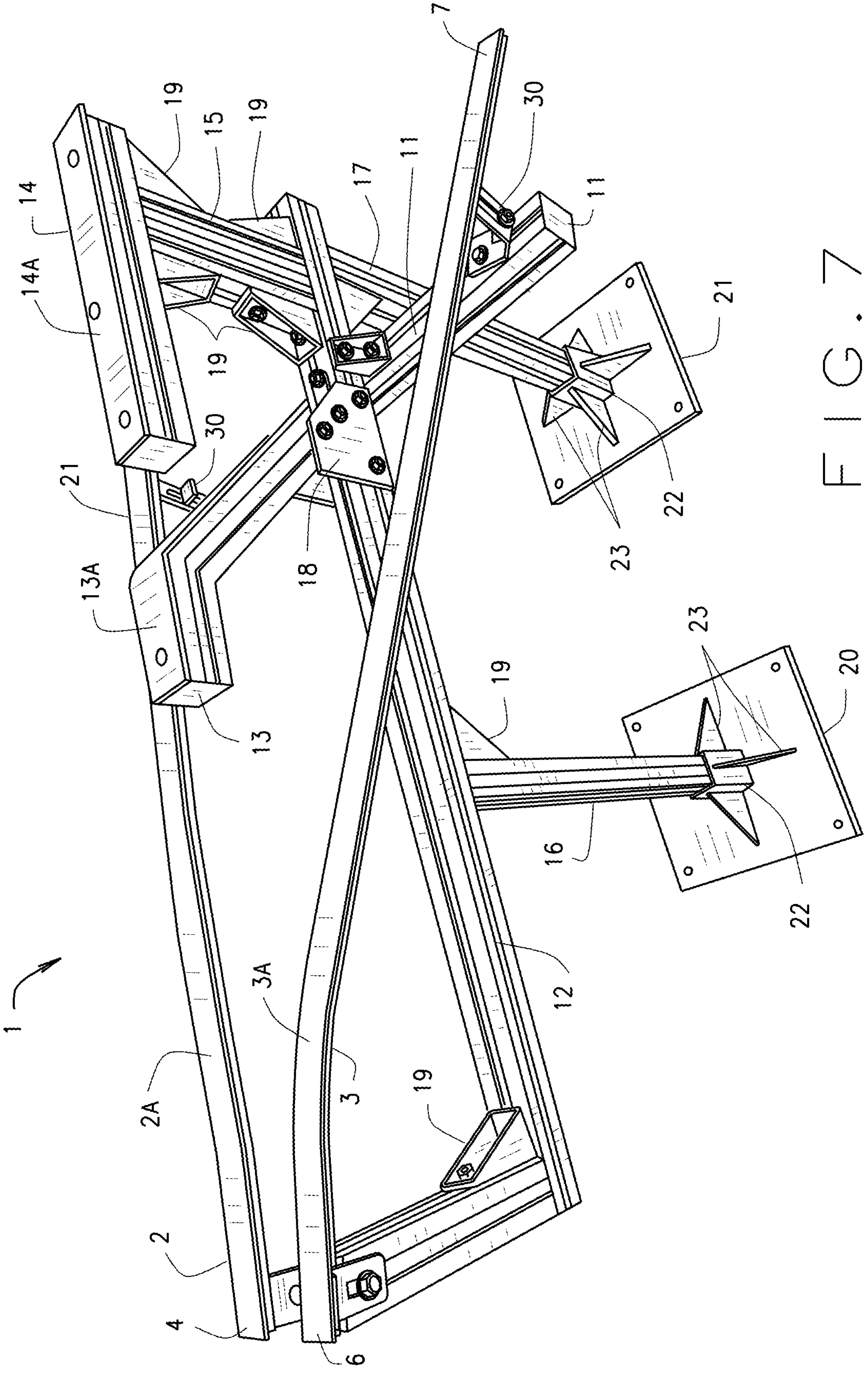
FIG. 7 shows a perspective view of the present invention.

Having described the invention 1 from six orthogonal views, turning the invention once more, FIG. 7 shows it in a perspective view. The rails 2, 3 extend from the left of the figure from the fore upright 10 to the right and down to the cross member. The rails 2, 3 continued past the cross member 11 so their fore ends 5, 7 span rearward of the cross member. The rails use clips 30, of a generally L like shape, to connect to the fore upright and the cross member. The fore upright and the cross member having lengthwise slots thereon as shown. The slots allow repositioning of a clip downward on the fore upright and outwardly on the cross member. Each rail may have different positions upon the fore upright and the cross member to erect a box of asymmetric pattern. Each rail has its layer, 2*a*, 3*a*, respectively, shown upward, that is, away from the baseplates 20. 21. The middle member 13 and the aft member 14 also have their layers 13*a*, 14*a*, respectively, shown upward so that the layers of the invention have similar orientation upward, that is, away from the baseplates 20, 21.

While a preferred embodiment of the box erecting device and method has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The box erecting device and method may have metallic, alloy, polymer, or a composite material as its construction. For example, any suitable sturdy material such as steel tubing or opposite facing C channel for the frame of the invention, aluminum for the rails, high-density polyethylene for the layers, and steel pins instead of bolted connections may be used instead previously mentioned materials. The invention has a construction of a sturdy material that resists corrosion during storage, allows for transportation and erection onsite, and that survives repeated use as hundreds of thousands of products, boxes, and cartons form upon it. Although providing a box erecting device and method has been described, it should be appreciated that the box erecting device and method herein described is also suitable for unfolding sheets and tarps, closing clamshell packaging, and the like where a box erecting device and method has desirable application.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples, or one or more aspects thereof, may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

We claim:

1. A box erecting device, comprising:

a first rail and a second rail, each of said first rail and said second rail having a fore end and an opposite aft end;

a spine between said first rail and said second rail;

a fore upright perpendicular to said spine and connecting to the fore end of said first rail and to the fore end of said second rail away from said spine;

a cross member transverse to said spine and opposite said fore upright, said cross member connecting to said first rail and said second rail outward from said spine and before the aft ends of each of said first rail and said second rail;

a middle member connecting to said spine ahead of said cross member and in the same direction as said fore upright;

an aft upright mutually parallel to said fore upright and spaced away from said fore upright, said aft upright connecting to said spine behind said middle member; and wherein said aft upright, said middle member, the fore end of said first rail, and the fore end of said second rail attain a coplanar orientation.

2. The box erecting device of claim 1 further comprising:

a fore leg extending perpendicular to said spine opposite said fore upright and positioning between said fore upright and said middle member;

an aft leg extending perpendicular to said spine opposite said aft upright and positioning outward from said aft upright, said aft leg being mutually parallel to said fore leg; and said fore leg connecting to a baseplate opposite said spine, and said aft leg connecting to another baseplate opposite said spine, wherein each baseplate is adapted to secure to a supporting surface.

3. The box erecting device and method of claim 2 further comprising:

said baseplate having a socket receiving said fore leg, said socket having a plurality of triangular gussets perpendicular to said socket and said fore leg;

said other baseplate having a socket receiving said aft leg, said socket having a plurality of triangular gussets perpendicular to said socket and said aft leg; and said cross member having a length and said spine having a width wherein the length of said cross member exceeds the width of said spine by at least a factor of four.

4. The box erecting device of claim 1 further comprising:

said first rail having an angle cross section with an upright leg perpendicular to a second leg upon a common vertex, said second leg having a layer joined thereto;

said second rail also having an angle cross section with an upright leg perpendicular to a second leg upon a common vertex, said second leg having a layer joined thereto;

said middle member having an angular shape with a portion of said middle member away from said spine have a layer joined thereto;

said aft upright having an aft member perpendicular to said aft upright and mutually parallel and spaced away from said spine, said aft member having a layer joined thereto; and wherein a portion of said layer upon the fore end of said first rail, a portion of said layer upon the fore end of said second rail, said layer upon said middle member, and said layer upon said aft member are coplanar.

5. The box erecting device of claim 4 wherein the layers upon said first rail, said second rail, said middle member, and said aft member have a low friction material of a coefficient of friction between 0.05 to 0.51.

6. The box erecting device of claim 5 wherein the low friction material is one of nylon, high density polyethylene, and ultra-high molecular weight polyethylene.

7. The box erecting device and method of claim 4 further comprising:

said first rail being capable of deflecting;

said second rail being capable of deflecting;

the fore end of said first rail having a mechanical connection to said fore upright;

the fore end of said second rail having a mechanical connection to said fore upright;

said first rail having a mechanical connection to said cross member before the aft end of said first rail; and said second rail having a mechanical connection to said cross member before the aft end of said second rail.

8. The box erecting device of claim 7 further comprising:

the mechanical connections of said first rail to said fore upright and to said crossmember being one of clips and clamps; and the mechanical connections of said second rail to said fore upright and to said crossmember being one of clips and clamps.

9. The box erecting device and method of claim 7 further comprising:

said fore leg, said spine, said aft leg, said fore upright, said aft upright, said middle member, said aft member, and said cross member each having lengthwise slots that receive the mechanical connections.

* * * * *